United States Patent [19]

Jannemann et al.

[11] Patent Number: 4,699,122
[45] Date of Patent: Oct. 13, 1987

[54] STORAGE WATER HEATER SYSTEM

[75] Inventors: Theo Jannemann, Dorsten; Horst Brünje, Recklinghausen, both of Fed. Rep. of Germany

[73] Assignee: Ruhrgas Aktiengesellschaft, Essen, Fed. Rep. of Germany

[21] Appl. No.: 793,499

[22] Filed: Oct. 31, 1985

Related U.S. Application Data

[63] Continuation of Ser. No. 590,800, Mar. 19, 1984, abandoned.

[30] Foreign Application Priority Data

Mar. 19, 1983 [DE] Fed. Rep. of Germany ....... 3310023

[51] Int. Cl.$^4$ ............................................. F24H 1/00
[52] U.S. Cl. .................................. 126/362; 126/351; 126/374; 122/16; 122/17
[58] Field of Search ............... 126/350, 351, 374, 375, 126/362, 365; 122/131, 118, 44 B, 159, 20 A, 20 B, 18, 17, 161, 166 R, 119, 16; 165/DIG. 2; 237/435, 437, 419, 421, 416

[56] References Cited

U.S. PATENT DOCUMENTS

| Re. 12,397 | 11/1905 | Deasy | 122/16 |
|---|---|---|---|
| 834,797 | 10/1906 | Gulick | 126/362 X |
| 985,787 | 3/1911 | Deasy | 122/16 X |
| 1,090,512 | 3/1914 | Antonuccio | 122/16 |
| 1,416,487 | 5/1922 | Mauck | 122/16 |
| 1,991,863 | 2/1935 | Morrow | 126/351 |
| 2,270,641 | 1/1942 | Ruppert et al. | 236/12.14 X |
| 2,335,918 | 12/1943 | Davis et al. | 122/16 |
| 2,478,836 | 8/1949 | Riley | 126/362 X |
| 2,814,279 | 11/1957 | Thomas | 122/18 |
| 2,884,197 | 4/1959 | Whittell | 126/362 X |
| 3,580,224 | 5/1971 | Rouet | 122/16 |
| 4,178,907 | 12/1979 | Sweat | 126/101 |
| 4,271,789 | 6/1981 | Black | 126/361 X |
| 4,334,518 | 6/1982 | Ort | 126/437 X |
| 4,380,215 | 4/1983 | Mendelson | 122/161 X |
| 4,401,058 | 8/1983 | Charrier et al. | 122/17 |
| 4,426,037 | 1/1984 | Bernstein | 122/16 X |
| 4,474,139 | 10/1984 | Dobias | 126/375 X |
| 4,492,185 | 1/1985 | Kendall et al. | 126/361 X |

Primary Examiner—Margaret A. Focarino
Attorney, Agent, or Firm—Fay, Sharpe, Beall, Fagan, Minnich & McKee

[57] ABSTRACT

A condensing storage water heater system comprises an inverted burner at the upper end of a water tank or cylinder connected to a vertical flueway passing through the center of the vessel. A finned heat exchanger is arranged coaxially in the flueway and the primary circuit water flowing through the heat exchanger and the products of combustion pass through the heat exchanger system in countercurrent flow. The burner and/or primary circuit flow are controlled using at least one temperature measuring device located in the storage tank so that condensation will be achieved by the heat exchanger arranged in the flueway.

25 Claims, 2 Drawing Figures

STORAGE WATER HEATER SYSTEM

This application is a continuation, of application Ser. No. 590,800 now abandoned, filed Mar. 19, 1984.

BACKGROUND OF THE INVENTION

The present invention relates to a storage water heater system wherein water for domestic use is heated by means of a burner such as a gas-fired burner.

Storage water heater systems comprising a storage tank or cylinder and a primary circuit incorporating a circulation pump and closed by said tank or cylinder are well known in the field of domestic water heating. The burner flueway of such a system may include a heat exchanger for preheating the water from the tank passing through said primary circuit. The condensation of water vapour in the products of combustion achieved by such known storage water heater systems is, however, insufficient and the heat transferred to the primary circuit water for heating said water is also inadequate.

It is the main object of the present invention to provide for an improved storage water heater system. It is also an object of the present invention to provide for a condensing storage water heater system to maximize the condensation of water vapour in the products of combustion, to optimize heat transfer from the products of combustion to the primary circuit water and to minimize heat loss during the stoppage of the burner used for heating said primary circuit water.

SUMMARY OF THE INVENTION

The storage water heater system provided for by the present invention comprises a storage tank or cylinder, a primary circuit incorporating a circulation pump connected with said storage tank or cylinder at two different points and closed by said storage tank or cylinder, an inverted burner connected to the top end of a substantially vertical flueway and finned heat exchanger means for heating water from said storage tank or cylinder passing through said primary circuit. Said heat exchanger means is arranged coaxially in said flueway and the heat exchanger carries primary circuit water flowing in the opposite direction of the direction of flow of the products of combustion passing through said flueway. In a preferred embodiment of the present invention, the flueway consists of piping arranged in a concentric manner in a storage cylinder or tank.

A very high rate of heat transfer to the primary circuit water is achieved by the recovery of the heat of condensation of the products of combustion through the combination of a) an inverted burner, b) a substantially vertical flueway taking the products of combustion from the top to the bottom of the storage cylinder or tank using an extruded heat exchanger means and c) the countercurrent flow of the primary circuit water to be heated through water pipework concentric with said heat exchanger means, heating the water entering said heat exchanger means at the bottom from a low temperature such as 15° C. directly to a high temperature such as 60° C. hence allowing a lower burner heat input rating. The quantity of water vapour condensed by such a system is high, the products of combustion being cooled in said heat exchanger means by countercurrent flow cold water below their dewpoint. It is an aspect of the present invention that because the burner rating required for increasing the primary circuit water temperature by a low margin such as 45° C. and the water flow rate are low, the burner will remain in operation for long periods of time and will be lit and extinguished less frequently than in the case of conventional storage water heater systems.

In one of the aspects of the invention, the heat exchange is optimized and the cost of the fabrication of the flue gas heat exchanger is reduced by using a finned aluminum alloy heat exchanger, said aluminum alloy being preferably specified for high resistance to corrosion by the condensate produced in said heat exchanger. Said heat exchanger material may be anodized to protect said heat exchanger against corrosion and to prevent the deposition of corrosion products. Since the primary circuit water must be of drinking water quality, said water is not carried directly by the heat exchanger tubing but by copper pipework passing through the center bore of said heat exchanger, said copper pipework in said heat exchanger being fit for connection to the remaining elements of said primary circuit consisting of copper pipes.

In a preferred simple embodiment of the invention, the cold water inlet is connected in the bottom region of the storage tank or cylinder with the primary circuit opening into said storage tank or cylinder at the outlet of said heat exchanger system in the upper region of said storage tank or cylinder, the cold water entering the waterway of said heat exchanger system and passing through said heat exchanger system in a direction of flow opposite to the direction of flow of the products of combustion cooling the products of combustion to a temperature below the dewpoint temperature.

In another aspect of the present invention, the burner is a fuel-lean burner fitted with a circular burner plate incorporating numerous fuel/air orifices of a diameter of 1 to 2 mm and preferably 1.8 mm, said burner plate being fitted to the upper end of said heat exchanger system and the primary circuit water pipework passing through said burner plate, heat being conducted from said water pipework to said burner plate for cooling said burner plate. In a preferred embodiment of said burner plate, said orifices are arranged in said burner plate in a circular pattern, the burner plate and the water pipework being concentric.

A particularly simple control system for the storage water heater system which is the subject of the present invention is characterized by the water temperature in the lower region of the storage tank or cylinder being measured by one temperature measuring device and the water temperature in the upper region of said storage tank or cylinder being measured by a second temperature measuring device, said temperature measuring devices actuating contacts or switches incorporated in the burner control loop and further characterized by the burner being lit by said first temperature measuring device when the temperature measured by said device is below a lower limit temperature such as 55° C. and said burner being shut off by said second temperature measuring device when the temperature measured by said device is above an upper limit temperature, such as 60° C., said upper limit temperature being higher than said lower limit temperature. The simple control system described hereinabove will achieve comparatively long burner operating periods and a comparatively small number of burner lighting and shut-off operations, water flow in said primary circuit being small.

In a further aspect of the present invention, water flow in the primary circuit may be controlled as a function of the temperature gradient in the water tank or cylinder by means of an adjustable flow control device, said device reducing flow if the temperature of the water returned to said water tank or cylinder is low, with cold water being added to the storage water heater system when the temperature in said water tank or cylinder is first heated to the working temperature level or when hot water is being tapped from the primary circuit or in similar cases, and said flow control device being fully opened when the temperature of the primary circuit water returning to said tank or cylinder is high when the water in said tank or cylinder is reheated or in similar cases, so that different temperature gradients will cause different primary circuit water flows. In the simple embodiment described hereinabove, the secondary circuit comprises a switch incorporated in a loop for controlling the actuator of said flow control means reducing the primary circuit flow to a set flow rate as water is tapped from said secondary circuit. In said preferred embodiment, a further temperature measuring device is provided in the lower region of the storage tank or cylinder close to the cold water inlet, said temperature measuring device being connected with the actuator of said flow control device by means of a control loop, flow in the primary circuit being reduced to a set flow rate if and when a temperature equal to the cold water temperature is measured at the bottom of said storage tank or cylinder.

In other embodiments of the present invention, the simple and effective on-off storage water heater system control may be replaced by a continuous or modulating burner control system or a stepless circulation pump control system eliminating the need for a flow control device in the primary circuit.

Still other objects, features and attendant advantages of the present invention will become apparent to those skilled in the art from the following detailed description of the preferred embodiment constructed in accordance therewith.

DESCRIPTION OF THE PREFERRED EMBODIMENT

Figure 1:
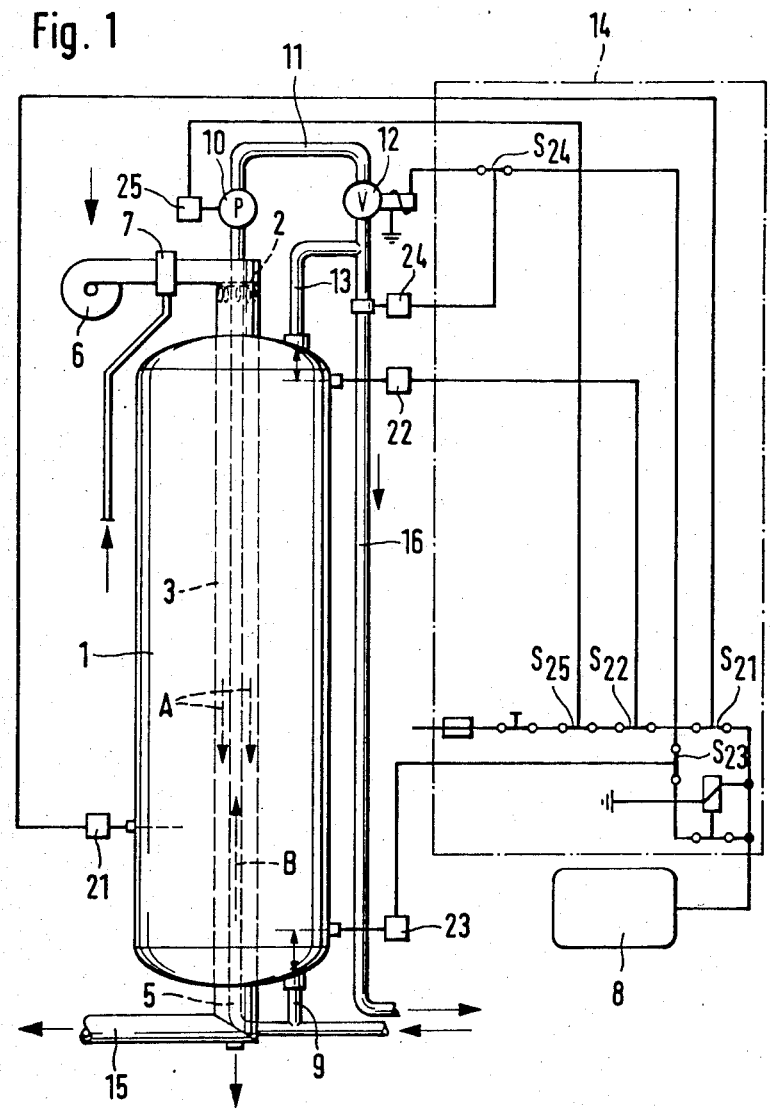
FIG. 1 is a schematic of a condensing storage water heater in accordance with the present invention not showing the conventional connections between the automatic burner control system and the fuel and air pipework.

FIG. 1 is a schematic showing the main components of the preferred embodiment of the storage water heater system which is the subject of the present invention.

A storage cylinder 1 holding approximately 200 l of water in the embodiment described is arranged in an upright position. Said cylinder is comparatively tall and narrow to optimize the stratification of water of different temperatures. A fuel-lean premix burner 2 is fitted at the top of said cylinder 1 and connected with a vertical flueway 3 passing through the center of said cylinder 1, said flueway being sealed from the water held by the storage cylinder 1 by means of welds.

A heat exchanger system 4 is arranged coaxially in said flueway 3, said heat exchanger system being hollow and copper pipework 5 being arranged inside the hollow space of said heat exchanger, copper being used for said pipework to facilitate connection with the remaining primary circuit pipework usually consisting of copper pipes and to prevent impurities in the drinking water in said primary circuit pipework. In the preferred embodiment described, the heat exchanger means is made from a finned aluminum alloy resistant to corrosion by the condensate produced in said heat exchanger means, the surfaces of said heat exchanger in contact with the products of combustion being anodized for protection against corrosion and for preventing the deposition of products of corrosion. In other embodiments of the present invention, conventional and preferably anodized fin tubes may be used with their fins in contact with the water pipework for heat transfer.

Figure 2:
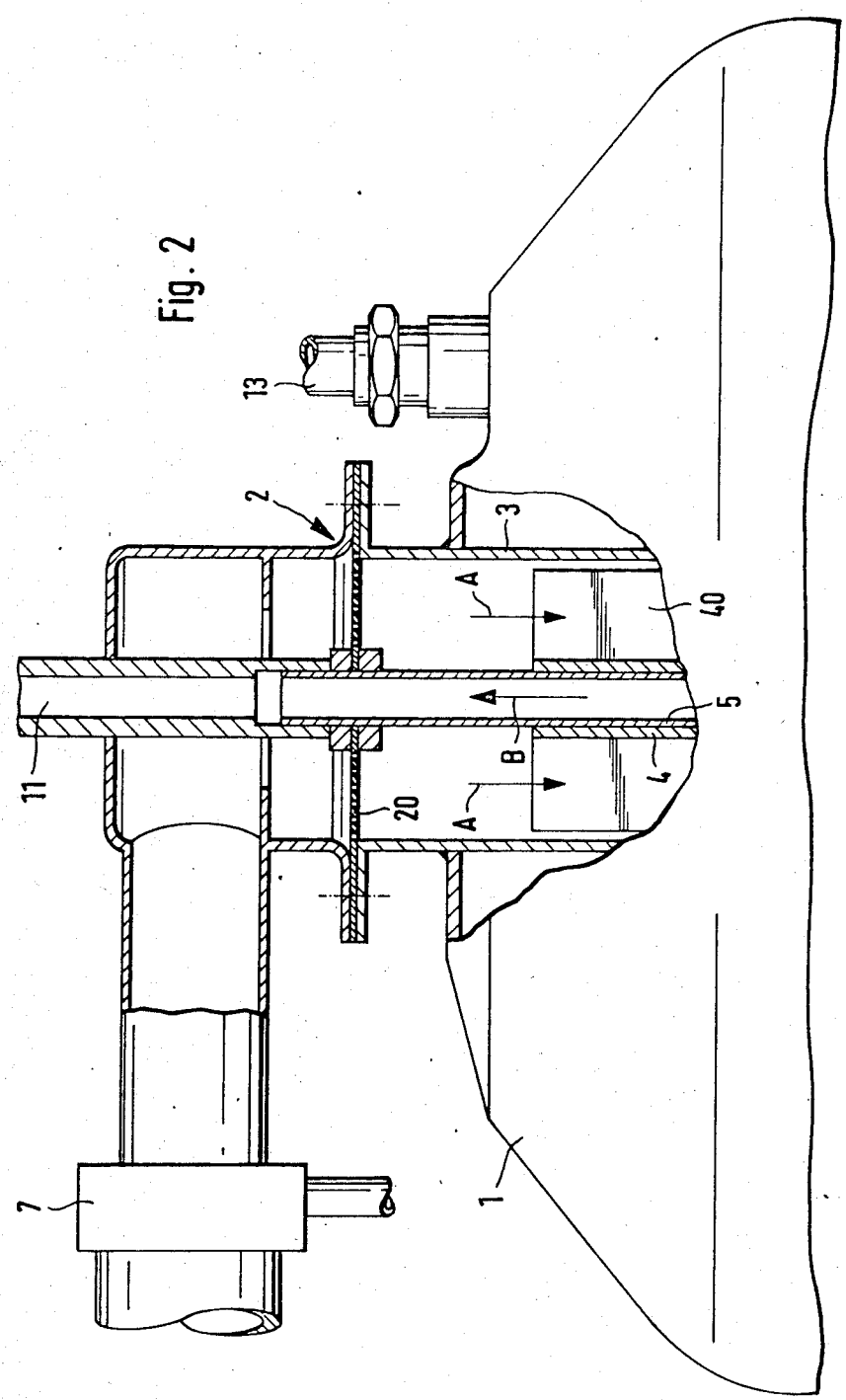
FIG. 2 is a section of the top of a storage cylinder, the burner configuration and the heat exchanger all designed in accordance with the present invention.

As FIG. 2 shows, the fuel-lean burner 2 is fitted with a circular burner plate 20 flanged directly to the flueway 3. Said burner plate 20 incorporates numerous fuel/air mixture orifices of a diameter of 1 to 2 mm and preferably 1.8 mm. The baffles or fins 40 of the heat exchanger means 4 stop immediately below the circular burner plate 20. The copper water pipe 5 inside the heat exchanger is connected with the burner plate 20 by a joint allowing the passage of heat. Since said copper pipe 5 is incorporated in the primary circuit, it cools said burner plate 20 as burners of the design employed require cooling.

Since the burner 2 is an inverted burner and the products of combustion are not exposed to any buoyancy effects, a combustion air fan 6 of comparatively low rating is incorporated in the storage water heater system provided for by the present invention. A fuel-lean gas/air mixture is obtained in the mixing device 7 mixing combustion air from the fan 6 and fuel from a gas line. Said mixer 7 may be fitted with a perforated plate for adjustment to natural gas and liquefied petroleum gas fuelling. FIG. 1 does not show the gas shut-off valve controlled by the automatic burner control system 8. The fuel-lean gas/air mixture is taken from the mixing device 7 through a mixer tube to the burner plate 20.

A cold water inlet 9 connected with the cold water line opens into the bottom region of the storage cylinder 1 and forms part of the primary circuit being connected therewith at the bottom end of the copper pipe 5 in the heat exchanger means 4. Cold water from the bottom region of the storage cylinder 1 and/or the cold water line being pumped by a circulation pump 10 in the direction of arrow B through the heat exchanger 3, 4, 5 and returned into the upper region of the storage cylinder 1 through a return line 11 and a flow control device 12 and a water inlet 13, said flow control device 12 being a solenoid valve in the present embodiment of the invention. Said flow control device 12 is closed under certain operating conditions and opened under certain other operating conditions as described below by means of a control loop 14 represented by a dashed and dotted line.

Given the inverted arrangement and the design of the burner 2, the design and the concentric arrangement of the heat exchanger means 4 in the narrow and tall storage cylinder 1 and the countercurrent flow of the water to be heated represented by arrow B and the products of combustion represented by the arrows A, the cold water from the inlet 9 or the cold water line may be heated from a low temperature such as 15° C. to a high temperature such as 60° C. in the primary circuit return line 11. The temperature rise required such as a temperature rise by 45° C. may be achieved by a burner 2 only rated for a heat input of approx. 4 kW considering the low primary circuit flow rate resulting in long burner operating periods and a comparatively low number of burner lighting and extinguishing operations, the low water inlet temperature at the bottom end of the heat exchanger and the optimized heat exchange in the comparatively long heat exchanger allowing effective water heating and the effective recovery of the heat of condensation contained in the products of combustion. The condensate so produced is tapped at the bottom end of the flueway as shown by FIG. 1, the products of combustion being vented to atmosphere through a room-sealed flue system 15.

In the embodiment of the present invention described, the burner 2, the circulation pump 10 and the flow control device 12 are controlled using three temperature measuring devices 21, 22 and 23 and a switch 24 incorporated in the secondary circuit 16. The temperature measuring device 21 is used to measure the water temperature in the lower region of the storage cylinder 1 and switches the burner 2 and the circulation pump 10 on by means of a relay $S_{21}$ incorporated in the burner and circulation pump control loops when the temperature measured is lower than a set lower limit temperature such as a temperature of 55° C. The second temperature measuring device 22 close to the hot water inlet 13 switches the burner 2 and the circulation pump 10 off and stops the heating operation using a relay $S_{22}$ when the water temperature in the upper region of the storage cylinder is higher than an upper limit temperature such as the temperature of 60° C., water being heated over a temperature range of 5° C. and flow through the fully opened flow control device 12 being high.

A third temperature measuring device 23 is located close to the cold water inlet 9 at the bottom of the storage cylinder 1, said temperature measuring device being connected with a relay $S_{23}$ incorporated in the control system of the flow control device 12 to set primary circuit flow to a small flow rate such as 70 1/hr or a large flow rate such as 700 1/hr. If the temperature measured by said temperature measuring device 23 is equal to the cold water temperature such as a temperature 15° C., relay $S_{23}$ opens interrupting the control loop of flow control device 12 and reducing the flow rate in line 11. If the temperature measured by the temperature measuring device 23 is higher than said cold water temperature, the relay $S_{23}$ will be closed. If hot water is tapped through line 16, the switch 24 interrupts the control loop of the flow control device 12 by way of relay $S_{24}$ reducing the rate of flow through said flow control device 12.

For excess temperature protection, a temperature limiter 25 is provided in the water pipework close to the burner plate 20 switching off the burner 2 by way of relay $S_{25}$ if the water temperature exceeds a limit temperature such as 90° C.

When water is first heated or when water is heated and cold water is pumped from the bottom region of the storage cylinder 1 through the heat exchanger means, the rate of water flow across the flow control device 12 is reduced to a low level such as a flow rate of 70 1/hr and the cold water is heated from the cold water temperature such as a temperature of 15° C. to a temperature such as a temperature of 60° C. and returned into the storage tank through inlet 13. When the water in the storage cylinder 1 is heated since the water temperature has fallen by a set temperature such as a temperature of 5° C., the flow control device 12 is fully opened with relays $S_{23}$ and $S_{24}$ being closed, the flow rate in the primary circuit being increased to a high level such as 700 1/hr and the temperature rise being achieved being reduced by the ratio between the low and the high water flow rates such as 1:10 from the temperature rise required for heating cold water to the temperature rise required for keeping the temperature in the storage cylinder such as a temperature rise of 5° C.

If water is tapped from the secondary circuit during the water heating operation, the control loop of the flow control device 12 is interrupted by relay $S_{24}$. As water is tapped from the storage cylinder 1 through line 16, the water in the primary circuit 5, 10, 11 and 12 is heated instantaneously at a low flow rate such as 70 1/hr thence adding to the capacity of the storage tank.

In the storage water heater system described herein, the products of combustion are cooled directly to a temperature below the dewpoint temperature using the heat exchanger means 4 and benefitting from the advantages of countercurrent flow achieving an excellent water heating efficiency and, considering that heat loss is considerably lower than in the case of conventional storage water heaters, a high overall efficiency.

It is to be understood that the invention is not limited to the embodiment described and shown but incompasses all modifications within the scope of the claims made.

We claim:
1. A storage water heater system, comprising:
a storage tank having a top portion and a bottom portion;
means for supplying cold water to said storage tank;
means for withdrawing hot water from said storage tank;
a flueway extending substantially vertically through said storage tank and having a first end portion passing through said top portion of said storage tank and a second end portion passing through said bottom portion of said storage tank;
a burner having outlet means for combustion products produced from said burner, said outlet means being mounted to said first end portion of said flueway such that said combustion products are passed downwardly into said flueway;
fan means for moving the products of combustion leaving said burner outlet means downwardly through said flueway and out of said second end portion;
a primary water circuit having a duct coaxially and centrally extending through a substantial vertical length of said flueway, said primary water circuit having a circulation water pump means for circulating water through said duct, and said primary water circuit having two spaced ports, each said port providing fluid communication between said storage tank and said duct;
heat exchanger means for enhancing the flow of heat from the combustion products to said duct for heating water from the storage tank circulating through said primary water circuit, said heat exchanger means having a fin-shaped cross sectional profile arranged coaxially in said flueway, and said heat exchanger means surrounding said duct;
said circulation water pump means pumping primary circuit water from said storage tank through one of said ports to pass through said duct inside said heat exchanger means upward in a direction of flow opposite to the downward direction of flow of the products of combustion and then flow through the other of said ports back to said storage tank;

control means, including at least one temperature measuring means for measuring water temperature in said storage tank, for controlling at least one of said burner and the flow rate of water pumped by said pump means through said primary circuit, for providing hot water available by the storage water heater at a substantially constant temperature.

2. A storage water heater system according to claim 1 wherein said means for supplying cold water has an inlet to supply cold water into said duct, said inlet being located at said second end portion of said flueway.

3. A storage water heater system according to claim 2, wherein one of the primary circuit ports is connected with said cold water inlet at the bottom portion of the water storage tank, and the other of said primary circuit ports enters the top portion of said storage tank.

4. A storage tank water heater system according to claim 3, wherein said burner has means to combust a fuel-lean mixture and said burner has a substantially circular burner plate with numerous fuel/air mixture orifices of a diameter of one to two millimeters;

said burner plate being fitted to the first end portion of said flueway; and said primary circuit water duct passing through said burner plate in a substantially vertical direction and said primary circuit water duct being heat conductively connected to said burner plate, for cooling said burner plate.

5. A storage tank water heater system according to claim 4, wherein said orifices form an annular pattern in said burner plate and said pattern is concentric to said duct.

6. A storage water heater system according to claim 3, wherein said means for withdrawing hot water is connected to and withdraws hot water from said other port of said primary circuit.

7. A storage water heater system according to claim 2, wherein said fin-shaped cross sectional profile of said heat exchanger means continuously extends from said flueway first end portion to said second end portion, and said heat exchanger means being dimensioned so as to provide a condensing heat exchanger for condensing flue gas passing through said second end portion.

8. A storage water heater system according to claim 1 wherein said fin-shaped cross sectional profile comprises an inner tube, and fins radially projecting from said tube at an angular distribution around said inner tube and continuously extending vertically along said inner tube.

9. A storage water heater system according to claim 8 wherein said fins have outer edges which are slightly inwardly spaced from said vertical flueway.

10. A storage water heater system according to claim 1, wherein said storage tank is a cylinder and said flueway is concentric with said cylinder.

11. A storage water heater system according to claim 1, wherein said heat exchanger is made of aluminum alloy material resistant to corrosion by the condensate produced in said flueway and said duct is made of copper.

12. A storage water heater system according to claim 1, wherein said one temperature measuring means measures the water temperature in the bottom portion of said storage tank;

said control means including a second temperature measuring means for measuring the temperature in the top portion of said storage tank, switch means actuated by said first mentioned temperature measuring means for operating the burner so that said burner is lit by said one temperature measuring means measuring a temperature below a lower limit temperature; and said switch means being actuated by said second temperature measuring means for shutting off said burner when said second temperature measuring means measures a temperature above an upper limit temperature, said upper limit temperature being higher than said lower limit temperature.

13. A storage water heater system according to claim 1, including an adjustable flow control device in said primary water circuit.

14. A storage water heater system according to claim 13, wherein said means for withdrawing hot water from said storage tank has switch means for controlling said flow control device so that the flow through the primary circuit is reduced to a set flow rate as hot water is withdrawn from said storage tank.

15. A storage water heater system according to claim 14, wherein said temperature measuring means is in the bottom portion of the storage tank close to said means for supplying cold water, said temperature measuring means being connected with said flow control device so that said control means reduces the flow in the primary water circuit to a set flow rate when a temperature equal to the cold water temperature is measured at the bottom of said storage tank.

16. A storage water heater system according to claim 13, wherein said temperature measuring means is in the bottom portion of the storage tank close to said means for supplying cold water, said temperature measuring means being connected with said flow control device so that said control means reduces the flow in the primary water circuit to a set flow rate when a temperature equal to the cold water temperature is measured at the bottom of said storage tank.

17. A storage water heater system according to claim 1, wherein said control means is such that the burner is lit, shut down and controlled as a function of temperature.

18. A storage water heater system according to claim 1, wherein said control means controls said water pump as a function of the water temperature in a stepless manner.

19. A storage water heater system according to claim 1, further comprising:

fan means for moving the products of combustion from the burner through said outlet means and from said first end portion through said flueway and out of said second end portion;

said control means, in response to water temperature within said storage tank below a predetermined fixed low temperature, controlling said burner and fan means for providing and passing products of combustion downwardly through said flueway, simultaneously controlling said pump means to pump water upwardly through said duct from the bottom portion to the top portion of said storage tank at a predetermined flow rate until sensing a water high temperature in said storage tank that is higher than said low temperature by a predetermined fixed amount.

20. A storage water heater system according to claim 19, further including means for automatically reducing the flow rate through said duct to a fraction of said predetermined flow rate when said means for withdrawing withdraws hot water from said storage tank and said means for supplying supplies cold water to said storage tank, with said fraction being generally equal to the difference between said high temperature minus said low temperature divided by the difference between the water temperature respectively at said spaced apart ports.

21. A storage water heater system according to claim 20, wherein said pump means is a continuously variable and controllable pump, and said means for automatically reducing continuously varies the capacity of said pump in response to the varying in the difference between the high temperature and the temperature of the water supplied by said means of supplying.

22. A storage water heater system according to claim 20, further including an adjustable flow control device in said primary water circuit; and
said means for reducing controlling said adjustable flow control device so that the flow through the primary circuit is reduced as hot water is withdraw from said storage tank by said means for withdrawing.

23. A storage water heater system according to claim 19, further including an adjustable flow control device in said primary water circuit; and
said control means controlling said adjustable flow control device so that the flow through the primary circuit is reduced as hot water is withdrawn from said storage tank by said means for withdrawing.

24. A storage water heater system according to claim 1, wherein said control means controls said burner to provide products of combustion and controls said pump means to pump water through said primary circuit whenever temperature of the water within said tank drops below a fixed first temperature and to discontinue the supplying of combustion products and the pumping of water when the temperature of the water within said tank rises to a temperature higher than said first temperature, with said pump means pumping the water through said duct at generally a fixed flow rate; and
means for reducing the flow rate through said duct whenever hot water is withdrawn from said tank by said means for withdrawing, with said reducing being a fraction of said fixed flow rate equal to the difference between the temperature of the water adjacent said ports divided by the difference between the temperature of the water being withdrawn by said means for withdrawing and the temperature of the water being supplied by said means for supplying.

25. A storage tank water heater system according to claim 1, further including fan means for moving the products of combustion from the burner through said outlet means and from said first end portion through said flueway and out of said second end portion;
said control means controlling said burner to provide products of combustion, controlling said fan means to blow the products of combustion through said flueway, controlling said pump means to pump primary water upwardly through said duct at a predetermined fixed rate whenever water temperature within said tank drops below a predetermined first temperature until the water temperature within said tank is raised to a predetermined higher second temperature; and means for reducing the flow rate of primary water through said duct to a fraction of said fixed flow rate that is generally equal to the difference between said higher temperature and said first temperature divided by the difference between the temperature of the water at the top of said duct and the temperature of the water at the bottom of said duct.

26. A storage water heater system, comprising:
a substantially cylindrical storage tank having a top portion and a bottom portion for storing heated water;
means for supplying cold water to said storage tank;
means for withdrawing hot water from said storage tank;
a flueway extending substantially vertically and concentrically through said storage tank and having a first end portion passing through said top portion of said storage tank and a second end portion passing through said bottom portion of said storage tank;
a burner having an outlet plate to discharge combustion products produced from said burner, said outlet plate being sealingly mounted to said first end portion of said flueway such that said combustion products are passed downwardly into said flueway and downwardly through said flueway to said second end portion;
fan means for moving the products of combustion from the burner through said outlet plate and from said first end portion through said flueway and out of said second end portion;
a primary water circuit having a duct coaxially and centrally extending through a substantial vertical length of said flueway, said primary water circuit having a circulation water pump means for circulating water through said duct, and said primary water circuit having two spaced apart ports, each said port providing fluid communication between said storage tank and said duct;
heat exchanger means for enhancing the flow of heat from the combustion products to said duct for heating water from the storage tank circulating through said primary water circuit, said heat exchanger means having a heat exchanger arranged coaxially in said flueway, and said heat exchanger means surrounding said duct; and
said circulation pump means pumping primary circuit water from said storage tank through one of said ports to pass through said duct inside said heat exchanger upward in a direction of flow opposite to the downward direction of flow of the products of combustion and then flow through the other of said ports back to said storage rack.

27. A storage water heater system according to claim 26, wherein said burner has means to combust a fuel-lean mixture;
said burner outlet plate being circular with a plurality of fuel-air mixture orifices of a diameter of one to two millimeters; and
said primary circuit duct passing through said burner outlet plate in a substantially vertical direction and said primary circuit water duct being heat conductively connected to said burner plate, for cooling said burner plate.

28. A storage water heater system according to claim 27, wherein said orifices form an annular pattern in said burner plate and said pattern is concentric with said duct.

29. A storage water heater system according to claim 26, wherein said means for supplying cold water has an inlet to supply cold water into said duct, said inlet being located at said second end portion of said flueway in the bottom portion of said storage tank; and said means for withdrawing hot water having an outlet in the top portion of said storage tank.

30. A storage water heater system according to claim 26, wherein said heat exchanger means is made of extruded aluminum alloy material resistant to corrosion by the condensate produced in said flueway; and wherein said primary water circuit duct is made of copper tubing.

31. A storage water heater system according to claim 26, further comprising:

a first temperature measuring means for measuring the water temperature in said bottom portion of said storage tank and a second temperature measuring means for measuring the temperature in said top portion of said storage tank;

switch means actuated by each of said temperature measuring means for operating said burner so that said burner is lit by said first temperature measuring means measuring a temperature below a lower limit temperature and said burner is shut off by said second temperature measuring means measuring a temperature above an upper limit temperature, said upper limit temperature being higher than said lower limit temperature.

32. A storage water heater system according to claim 31, further comprising an adjustable flow control device in said primary circuit;

said means for withdrawing hot water from said storage tank has switch means for controlling said flow control device so that the flow rate through the primary circuit is reduced to a set flow rate as hot water is withdrawn from said storage tank.

* * * * *